United States Patent
Choi et al.

(10) Patent No.: US 7,526,398 B1
(45) Date of Patent: Apr. 28, 2009

(54) METHOD AND APPARATUS FOR CALIBRATING GYRO-SENSOR

(75) Inventors: Ki-wan Choi, Anyang-si (KR);
Hyuong-ki Lee, Suwon-si (KR); Hyeon Myeong, Hwaseong-si (KR);
Yong-beom Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 204 days.

(21) Appl. No.: 11/524,397

(22) Filed: Sep. 21, 2006

(30) Foreign Application Priority Data

Sep. 21, 2005 (KR) .................. 10-2005-0087746
Aug. 9, 2006 (KR) .................. 10-2006-0075221

(51) Int. Cl.
*G06F 19/00* (2006.01)
*G01C 25/00* (2006.01)
*G01C 19/00* (2006.01)

(52) U.S. Cl. .............. 702/104; 73/1.01; 73/1.37; 73/1.38; 73/1.75; 73/1.77; 73/488; 73/497; 73/504.18; 702/85; 702/96

(58) Field of Classification Search .......... 73/1.01, 73/1.37, 1.38, 1.41, 1.75, 1.77, 488, 497, 73/504.02, 504.08, 504.18; 324/160, 166, 324/167, 168, 173, 175, 178, 179; 702/1, 702/85, 94, 96, 104, 127, 150, 151, 189
See application file for complete search history.

(56) References Cited

U.S. PATENT DOCUMENTS

| 4,507,737 A | * | 3/1985 | LaSarge et al. | 701/220 |
| 5,699,256 A | * | 12/1997 | Shibuya et al. | 701/220 |
| 7,155,974 B2 | * | 1/2007 | Saito et al. | 73/497 |
| 2005/0183501 A1 | * | 8/2005 | Saito et al. | 73/497 |

FOREIGN PATENT DOCUMENTS

| JP | 62254212 | 11/1987 |
| KR | 10-1993-0018260 | 9/1993 |
| KR | 10-2004-0062038 | 7/2004 |

* cited by examiner

*Primary Examiner*—Edward R Cosimano
(74) *Attorney, Agent, or Firm*—Staas & Halsey LLP

(57) ABSTRACT

A method and apparatus for calibrating a gyro-sensor, by which a gyro-sensor can be calibrated using data which is obtained by measuring an angular velocity and a gyro output value of a moving body equipped with the gyro-sensor. The method includes measuring an angular velocity of a moving body and an average output value of the gyro-sensor when the moving body, equipped with the gyro-sensor, rotates, obtaining data about a characteristic equation of the gyro sensor using the measured angular velocity and the average output value and storing the data, and calibrating the gyro-sensor using the stored data about the characteristic equation.

45 Claims, 8 Drawing Sheets

METHOD AND APPARATUS FOR CALIBRATING GYRO-SENSOR

CROSS-REFERENCE TO RELATED APPLICATIONS

This application is based on and claims priority from Korean Patent Application Nos. 10-2005-0087746 and 10-2006-0075221, respectively filed on Sep. 21, 2005 and Aug. 9, 2006, respectively, the disclosures of which are hereby incorporated herein by reference.

BACKGROUND OF THE INVENTION

1. Field of the Invention

The present invention relates to a method and apparatus for calibrating a gyro-sensor, and more particularly, to a method and apparatus for calibrating a gyro-sensor by which a gyro-sensor can be calibrated using data which is obtained by measuring an angular velocity and a gyro output value of a moving body equipped with the gyro-sensor.

2. Description of Related Art

A gyro-sensor is one example of an inertial sensor. An inertial sensor senses the motion of a handheld terminal and may be configured with an accelerometer and a gyroscope. An accelerometer is a sensor that measures an acceleration of a moving object, while a gyroscope is a sensor that measures a rotational angular velocity of a moving object. Gyro-sensors, which provide angular displacement and angular velocity information, have been widely adopted in various fields such as model airplane attitude control, and inertial navigation system (INS) for the guided control of ships, aircrafts and munitions. In other words, the application of gyro-sensors ranges across almost all existing industrial fields such as automobiles, ships, factory automation, marine exploration, and airspace exploration. Technology has been developed in earnest and has been continuously improved according to a demand for a small-sized, lightweight, less expensive, highly-efficient and precise gyro sensors.

From the viewpoint of manufacturing cost, gyro-sensors can be classified into high-priced gyro-sensors and low-priced gyro-sensors. While ensuring excellent performance, high-priced gyro-sensors tend to be expensive and, as such, are not cost-effective when applied to mobile robots requiring cost competitiveness, e.g., robot vacuum cleaners. Thus, low-cost gyro-sensors are applied to such mobile robots. In order ensure satisfactory performance of a low-priced gyro-sensor even when it is applied to a robot vacuum cleaner, the low-priced gyro-sensor needs to be calibrated appropriately for achieving optimized performance.

First, gyro-sensors may be calibrated when manufactured. However, calibrating each of a considerable number of gyro-sensors may involve an increase in the manufacturing cost, which is not cost-effective. In addition, since the gyro-sensors and circuits characteristics may vary due to environmental factors changing with time, the accuracy of the gyro-sensors is likely to degrade after an extended use of period, which is generally called aging.

To address such a problem, in a conventional method of calibrating in real time a gyro-sensor in a mobile robot disclosed in Korean Patent Publication No. 10-2004-0062038, entitled "Method of Compensating for Offset of Robot Cleaner," an orientation error of a robot cleaner is compensated for by correcting an offset value of a gyro-sensor, thus minimizing the orientation error of the robot cleaner regardless of variations in the offset of the gyro-sensor. However, an offset of the gyro-sensor can be compensated for only in a stop mode and a characteristic curve based on a gyro characteristic equation cannot be calibrated.

BRIEF SUMMARY

An aspect of the present invention provides a method and apparatus for calibrating a gyro-sensor, by which a gyro-sensor can be calibrated using data which is obtained by measuring an angular velocity and a gyro output value of a moving body equipped with the gyro-sensor.

An aspect of the present invention also provides a method and apparatus for calibrating a gyro-sensor, by which a reduction of accuracy due to a characteristic curve of the gyro-sensor delicately varying over a change of temperatures.

According to an aspect of the present invention, there is provided a method of calibrating a gyro-sensor, the method including (a) measuring an angular velocity of a moving body and an average output value of the gyro-sensor when the moving body, equipped with the gyro-sensor, rotates, (b) obtaining data about a characteristic equation of the gyro sensor using the measured angular velocity and the average output value and storing the data, and (c) calibrating the gyro-sensor using the stored data about the characteristic equation.

According to another aspect of the present invention, there is provided an apparatus for calibrating a gyro-sensor, the apparatus including a measurement module obtaining an angular velocity of a moving body and an average output value of the gyro-sensor when the moving body, equipped with the gyro-sensor, rotates, an operation module obtaining data about a characteristic equation of the gyro sensor using the obtained angular velocity and the average output value, a storage module storing the obtained data, and a calibration module calibrating the gyro-sensor using the stored data about the characteristic equation.

According to another aspect of the present invention, there is provided a method of a method of enhancing an efficiency of location estimation of a mobile robot, the method including measuring an angular velocity of the mobile robot via a gyro-sensor in the mobile robot and measuring an average output of the gyro-sensor at each of plural temperatures, obtaining a characteristic equation for each of the temperatures, each characteristic equation yielding a characteristic curve usable to estimate a location of the mobile robot in real time, and calibrating the gyro-sensor based on data of at least one of the plurality of characteristic equations corresponding to a current temperature.

According to other aspects of the present invention, there are provided computer-readable storage media encoded with processing instructions for causing a processor to execute the aforementioned methods.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
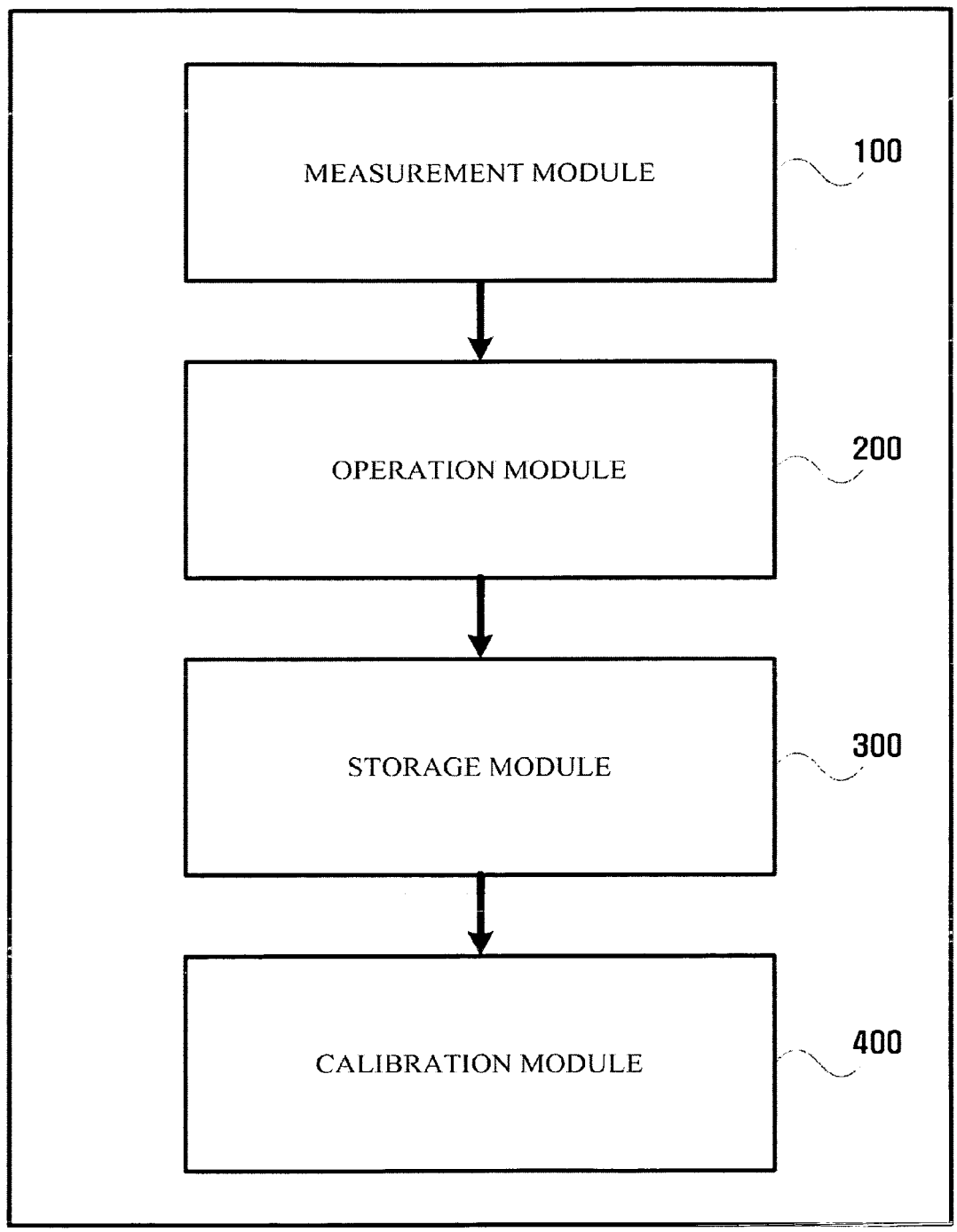
FIG. 1 is a block diagram of a gyro-sensor according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

A method and apparatus for calibrating a gyro-sensor according to an embodiment of the invention will be described with reference to the accompanying drawings.

FIG. 1 is a block diagram of a gyro-sensor according to an embodiment of the present invention. Referring to FIG. 1, the gyro-sensor includes a measurement module 100 which measures an angular velocity and a gyro output value, an operation module 200 which obtains data about a characteristic curve, a storage module 300 which stores the data about the characteristic curve, and a calibration module 400 which calibrates the gyro-sensor.

To obtain a characteristic equation of an n-th degree representing a characteristic curve of the gyro-sensor, the measurement module 100 measures an angular velocity and a gyro output value of a moving body equipped with the gyro-sensor. In the characteristic curve of the gyro-sensor, the gyro output value (mV) of the gyro-sensor is an independent variable and the angular velocity (deg/sec) of the gyro-sensor is a dependent variable. The obtained angular velocity and output value are data for obtaining coefficients of the characteristic equation.

The angular velocity ω can be measured using a rotation time period T measured at a fixed location of the moving body by the equation:

$$\omega = \frac{2\pi}{T}.$$

The rotation time period T is measured in one of the following two methods: a first method which is associated with the use of infrared transmission and reception units and a second method which is associated with the use of hole sensors which sense a magnetic field.

Figure 7:
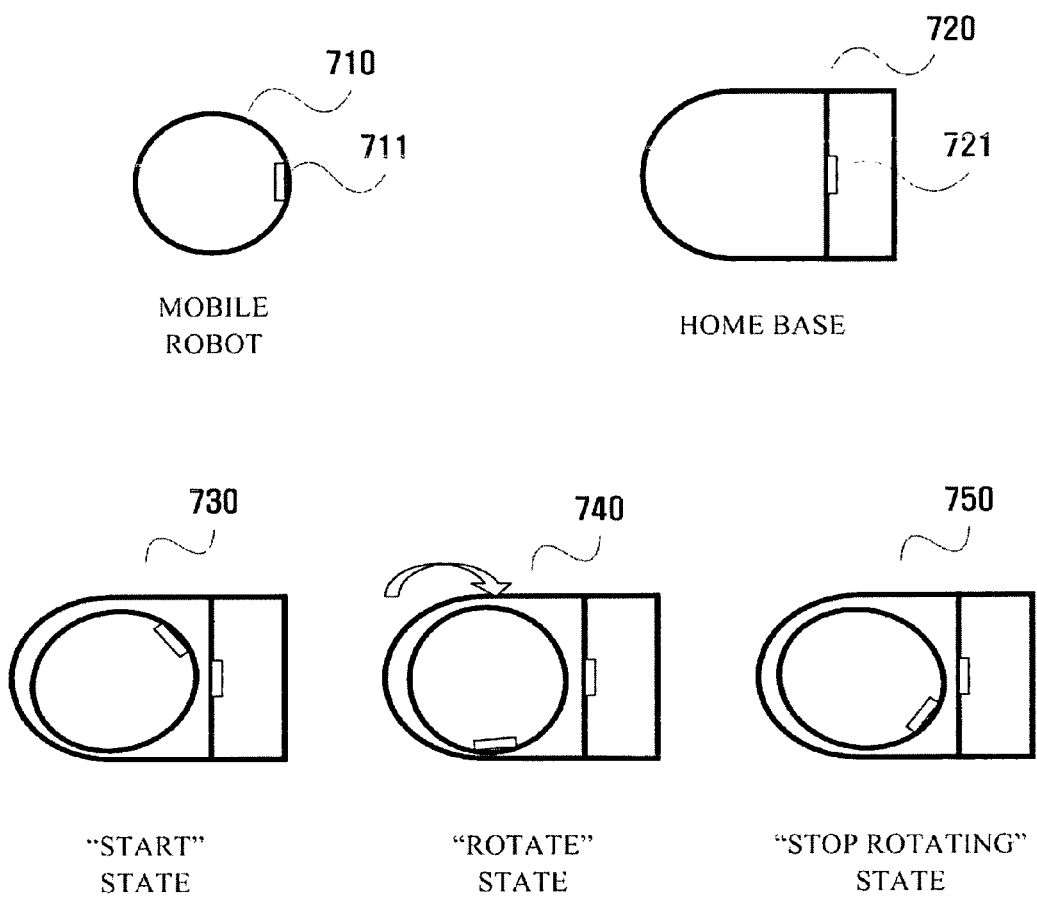
FIG. 7 is a diagram illustrating a method of measuring an angular velocity of a moving body using infrared rays according to an embodiment of the present invention.

In the first method, it is assumed that a moving body having an infrared reception unit rotates at a constant angular velocity on a home base having an infrared transmission unit, which is illustrated in FIG. 7. FIG. 7 is a diagram illustrating a method of measuring an angular velocity of a moving body 710 using infrared rays according to an embodiment of the present invention.

Referring to FIGS. 1 and 7, the measurement module 100 measures the angular velocity ω of the moving body 710 equipped with an infrared reception unit 711 when the moving body 710 begins to rotate on a home base 720 having an infrared transmission unit 721 in a "START" state 730, enters a "ROTATE" state 740, and then rotates at a constant angular velocity. First, in the "ROTATE" state 740, the measurement module 100 measures a first sensing time at which the infrared reception unit 711 senses for the first time infrared rays emitted by the infrared transmission unit 721. Thereafter, the moving body 710 rotates once, and then, the measurement module 100 measures a second sensing time at which the infrared reception unit 711 senses for the second time infrared rays emitted by the infrared transmission unit 721. A difference between the first sensing time and the second sensing time is the rotation time period T. Using the rotation time period T, the angular velocity ω can be obtained.

The rotation time period T may be obtained at each angular velocity while varying angular velocity values measured at a variety of points of measurement time. Since the gyro characteristic equation is an equation of an n-th degree and (n+1) coefficients are available. A constant term corresponding to an off-set can be obtained by measuring a gyro output value in a "STOP ROTATING" state of the moving body 710, that is, ω=0. Non-limiting examples of the "STOP ROTATING" state of the moving body 710 include a state immediately before the moving body 710 is separated from the home base 720 to perform a specified operation or a state immediately after the moving body 710 terminates a specified operation to return to the home base 720.

Accordingly, an iteration of the above-described operations is performed while varying the angular velocity ω n times, which is equal to the number of coefficients of the gyro characteristic equation, exclusive of the number of the constant term, i.e., one, to obtain n rotation time periods T Also, n angular velocities ω can be measured by the equation:

$$\omega = \frac{2\pi}{T}.$$

In addition, the measurement module 100 obtains an average output value of the gyro-sensor by integrating a plurality of gyro output values measured over the rotation period T between the first sensing time and the second sensing time. A set of n measurements of angular velocity and n average output values corresponding to the measurements of angular velocity are obtained by obtaining the average output value of the gyro-sensor n times while the measurement module 100 measures the angular velocity n times. The obtained set is used as data for obtaining coefficients of the gyro characteristic equation.

Figure 8:
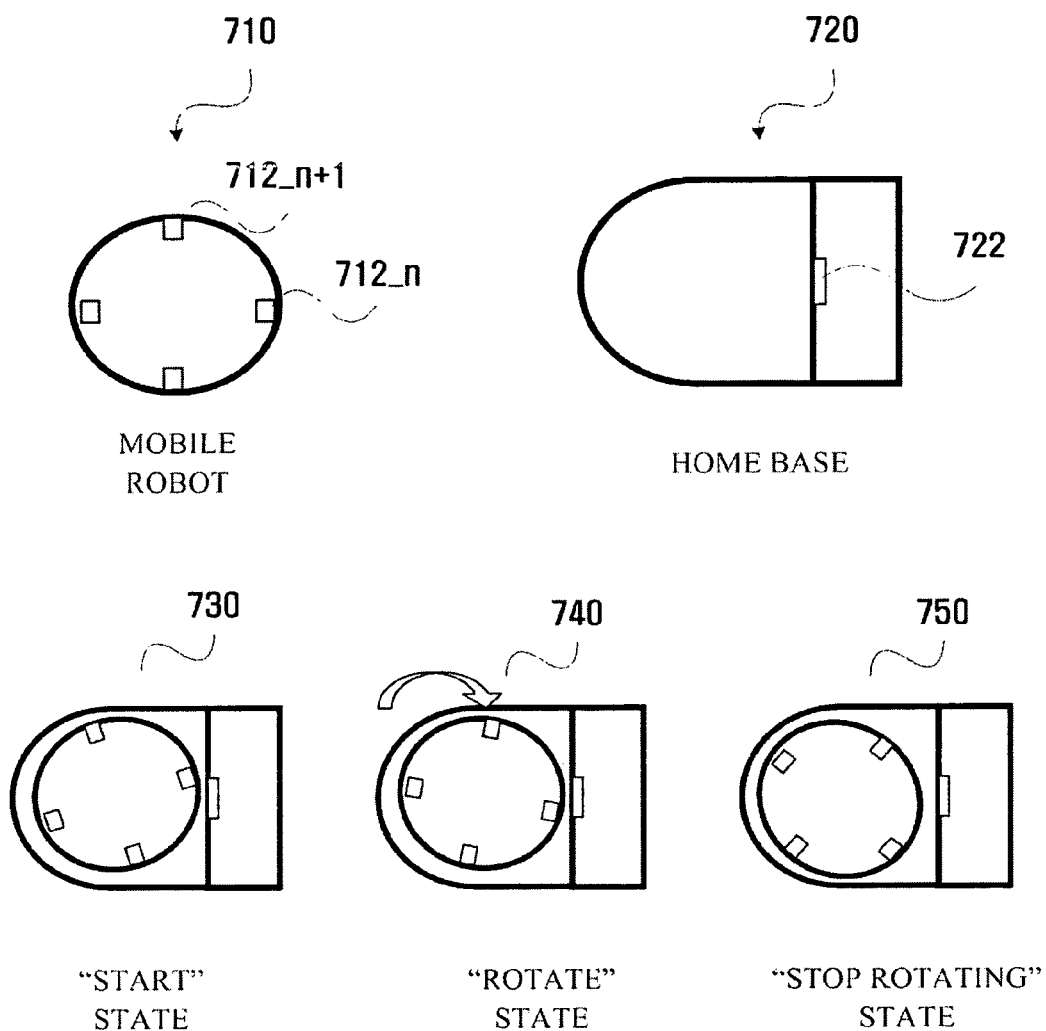
FIG. 8 is a diagram illustrating a method of measuring an angular velocity of a moving body using a plurality of hole sensors according to an embodiment of the present invention.

In the second method in which an angular velocity and a gyro output value may be measured using a hole sensor which senses a magnetic field, it is assumed that a moving body equipped with a plurality of hole sensors disposed in constant intervals rotates at a constant angular velocity on a home base in which a permanent magnet is disposed, which is illustrated in FIG. 8. FIG. 8 is a diagram illustrating a method of measuring an angular velocity of a moving body using a plurality of hole sensors according to an embodiment of the present invention.

Referring to FIGS. 1 and 8, the measurement module 100 measures a first sensing time at which a permanent magnet 722 provided in the home base 720 is sensed by an nth sensor 712_n among the plurality of hole sensors. Thereafter, the measurement module 100 measures a second sensing time at which the permanent magnet 722 is sensed by an (n+1)th sensor 712_n+1. A difference between the first sensing time and the second sensing time is the rotation time period T. Using the rotation time period T, the angular velocity ω can be obtained.

A rotation time period T may be obtained at each angular velocity while varying angular velocity values measured at a variety of points of measurement time. n rotation time periods T is obtained by performing an iteration of the above-described operations while varying the angular velocity ω n times, which is equal to the number of coefficients of the gyro characteristic equation, exclusive of the number of the constant term, i.e., one. Also, n angular velocities ω can be measured by the equation:

$$\omega = \frac{2\pi}{T}.$$

In addition, the measurement module 100 obtains an average output value of the gyro-sensor by integrating the gyro output values measured over the rotation period T between the first sensing time and the second sensing time. A set of n measurements of angular velocity and n average output values corresponding to the measurements of angular velocity are obtained by obtaining the average output value of the gyro-sensor n times while the measurement module 100 measures the angular velocity n times.

Figure 6:
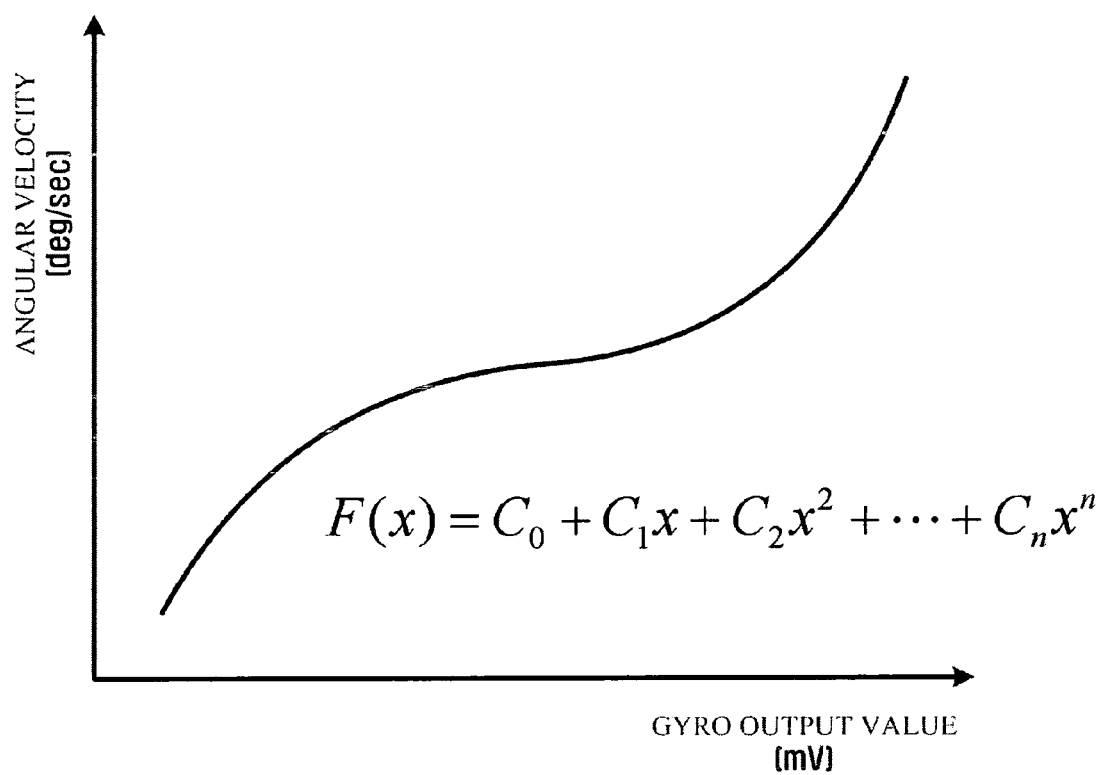
FIG. 6 is a diagram illustrating a characteristic curve derived from a gyro characteristic equation according to an exemplary embodiment of the present invention.

Referring to FIG. 6, which illustrates a characteristic curve derived from the gyro characteristic equation, the characteristics of the curve shown in FIG. 6 can be expressed by:

$$F(x)=C_0+C_1x+C_2x^2+\ldots+C_nx^n.$$

The output value of the gyro sensor is set as an independent variable x and the an angular velocity is set as a dependent variable, and $C_0, C_1, C_2, \ldots, C_n$ are coefficients of the gyro characteristic equation. Since the gyro characteristic equation is an equation of an n-th degree, the number of the coefficients $C_0, C_1, C_2, \ldots, C_n$ is n+1 in total and n+1 coordinate values are necessary to obtain the n+1 coefficients. (n+1) tuple sets are determined, each tuple set consisting of gyro output values x, which are experimentally determined values, and measurements of angular velocity F(x), which are obtained based on the rotation time period measured in either way of using of infrared transmission and reception units or using of hole sensors sensing a magnetic field.

Alternatively, the tuple set consisting of gyro output values x and measurements of angular velocity F(x) may also be obtained by installing a gyro-sensor at a rotation axis of a rotation motor in the moving body.

Referring to FIGS. 1 and 6, the operation module 200 obtains data about the characteristic equation of the gyro-sensor based on the angular velocity and the average output value obtained by the above-described method. In detail, the operation module 200 substitutes tuple sets consisting of n measurements of angular velocity (deg/sec) and n average output values (mV) for the characteristic equation, thereby solving the simultaneous equations for obtaining coefficients $C_1, C_2, \ldots, C_n$, exclusive of a constant term $C_0$ among coefficients $C_0, C_1, C_2, \ldots, C_n$ of the characteristic equation of an n-th degree, as expressed in the above equation. The storage module 300 stores the data about the obtained coefficients of the characteristic equation, and the calibration module 400 converts the gyro output value into an angular velocity using the stored data for real-time calibration.

In calibrating the gyro-sensor, however, consideration may be taken of the fact that coefficient values of the characteristic equation vary according to the current temperature at which the gyro-sensor operates. In this case, the characteristic equation may be obtained at different temperatures for storage. Next, a method of obtaining a plurality of characteristic equations varying according to temperatures will be described.

The measurement module 100 indicates a value of the current temperature measured at a time at which a set of the angular velocity the average output value are obtained as a temperature index, obtains a set value at a specified temperature interval over a specified temperature range including the value of the current temperature. That is to say, the measurement module 100 obtains tuple sets consisting of n measurements of angular velocity (deg/sec) and n average output values(mV) measured at different temperatures at a specified interval within a specified temperature range and matches the obtained tuple sets with the temperatures measured when the respective ones of the tuple sets are obtained.

Here, the specified temperature range is a temperature environment in which the moving body can operate, by way of a non-limiting example, in the range of between about −10° C. and about 40° C. The temperatures may be measured at a temperature interval of about 2° C. Since the gyro output value (x) is temperature-dependent, it is necessary to yield a set by as n measurements of angular velocity and n gyro output values to obtain as many data measures as possible, which means the temperature interval may set to be quite small, so that there are quite many temperature measurements available within the specified temperature range.

After obtaining the set values based on the measured temperatures of the specified interval, the operation module 200 obtains characteristic equations based on the set values using the respective measured temperatures as indexes. In detail, the operation module 200 obtains coefficients, i.e., $C_1, C_2, \ldots, C_n$, using a set of n measurements of angular velocity and n gyro output values and the constant term, i.e., $C_0$, thereby providing data about the characteristic equations using the respective temperatures as indexes.

The storage module 300 matches the data about the characteristic equation obtained in the above-described manner to the temperature indexes to then store the matched data, or stores the coefficients $C_0, C_1, C_2, \ldots C_n$ of the characteristic equation. If duplicate data about the characteristic equation are stored in the storage module 300 as the same temperature index, the storage module 300 updates the data about the characteristic equation using the most recently stored data.

When a characteristic curve may be calibrated in real time while the moving body performs an actual operation, the calibration module 400 substitutes the gyro output value measured by the measurement module 100 for the characteristic equation stored in the storage module 300 to convert the gyro output value into a value of angular velocity, thereby calibrating the gyro-sensor in real time. For calibration of the gyro-sensor, it is necessary to examine a characteristic model of the gyro-sensor. The characteristic model can be expressed by:

$$\tilde{\omega}_z=(1+S_z)\omega_z+M_x\omega_x+M_y\omega_y+B_{fz}+B_{gx}a_x+B_{gy}a_y+B_{gz}a_z+n_z.$$

The left side ($\tilde{\omega}_z$) indicates the gyro output value reflecting various factors represented by terms in the right side in a case of using the z-axis of a mobile robot as a rotation axis. The last term ($n_z$) in the right side indicates a bias randomly varying over time and is a substantially uncalibratable term. A factor of XY coupling ($M_x\omega_x+M_y\omega_y$), i.e., the sum of the second and third terms in the right side, indicates an error generated by rotation of the x-axis and the y-axis, which is trivial enough to be negligible compared to an error generated by rotation of the z-axis. A factor of g-sensitivity ($B_{gx}a_x+B_{gy}a_y+B_{gz}a_z$), the sum of the fifth through seventh terms, indicates an error generated by acceleration applied to the gyro-sensor, which is also negligible.

The fourth term ($B_{fz}$) in the right side indicates a constant bias, which does not vary over time but varies with a correlation with temperature, suggesting that temperature-dependent calibration is necessary. In this case, the calibration is performed in a "STOP ROTATING" state of the moving body, that is, in a state where the angular velocity is zero. The constant bias can be represented by a constant term $C_0$ in the above characteristic equation of the gyro-sensor. Finally, $S_z$ in the first term $(1+S_z)\omega_z$ is an scaling factor indicating the correlation between the angular velocity and the gyro output value, which delicately varies according to the angular velocity and temperature. The scaling factor can be represented by the remaining coefficients $C_1, C_2, \ldots, C_n$ in the gyro characteristic equation, exclusive of the constant term $C_0$.

In the right side of the equation for the characteristic model, the first term and the fourth term are to be calibrated. Since the method of obtaining the constant term is the same as described above, a method of calibrating the angular velocity based on the gyro output value will now be described.

First, when characteristic equations for temperature indexes are stored in the storage module 300, a current temperature is measured at a time when the location of the moving body 710 is estimated by means of the gyro-sensor and it is detected whether or not there is data about the characteristic equation stored in a database of the storage module 300 using the measured current temperature as the temperature index. If there is corresponding data in the database, the data corresponding to the characteristic equation is detected. If not, data about two characteristic equations corresponding to a pair of upper and lower temperatures that are closest to the measured current temperature is detected. Alternatively, after detecting the two characteristic equations corresponding to the upper and lower temperatures that are closest to the measured current temperature, a characteristic equation corresponding to the measured current temperature may be obtained through interpolation.

When the measurement module 100 measures the gyro output value of the moving body 710 performing its operation at the current temperature, the calibration module 400 converts the gyro output value into the angular velocity using the data about the detected characteristic equation. In such a manner, the characteristic curve of the gyro-sensor can be adaptively calibrated in real time. If there is a temperature change not less than a specified temperature level, the calibrating operation may be performed again because the characteristic equation is changed due to the temperature change. In this case, it is necessary to detect a characteristic equation for a new temperature and convert a gyro output value into a new angular velocity value by substituting the gyro output value for the detected characteristic equation. Here, the temperature change is preferably not less than ° C.

Meanwhile, the term 'module', as used in FIG. 1, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more central processing units (CPUs) in a device.

Figure 2:
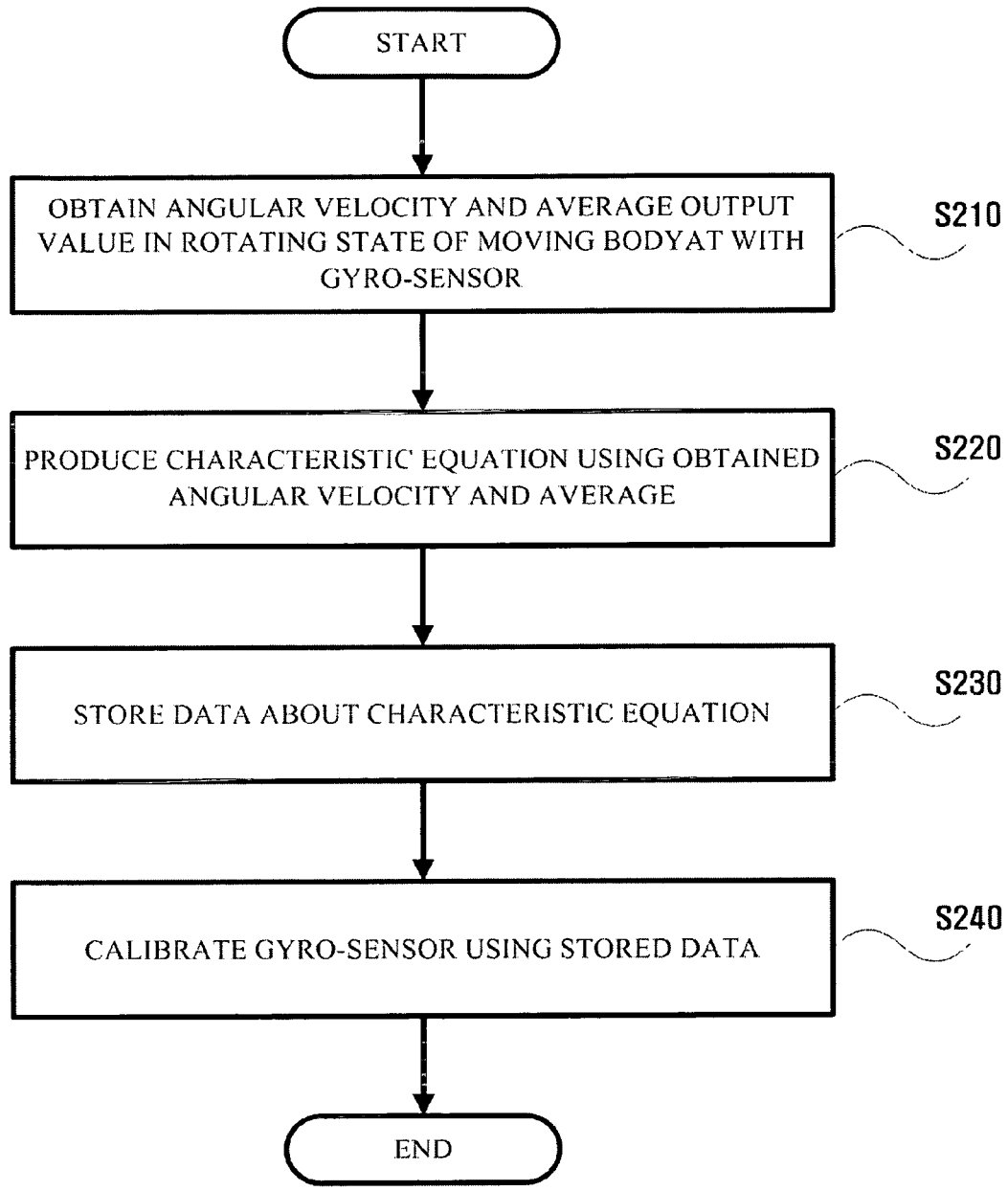
FIG. 2 is a flowchart illustrating a method of calibrating a gyro-sensor according to an embodiment of the present invention.
Figure 3:
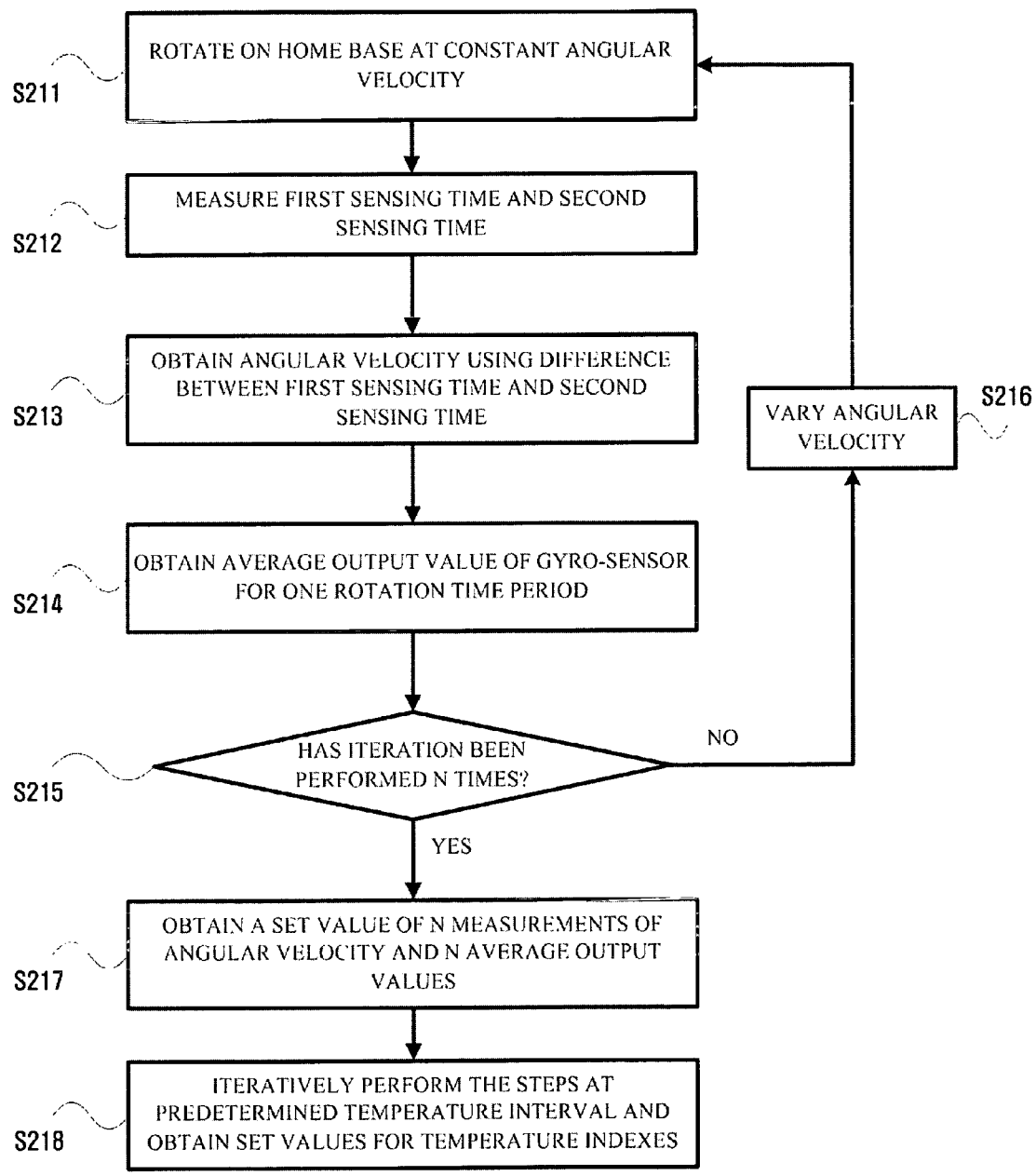
FIG. 3 is a detailed flowchart illustrating the measurement of an angular velocity and an output value of a gyro-sensor in the method of calibrating a gyro-sensor according to an embodiment of the present invention.
Figure 4:
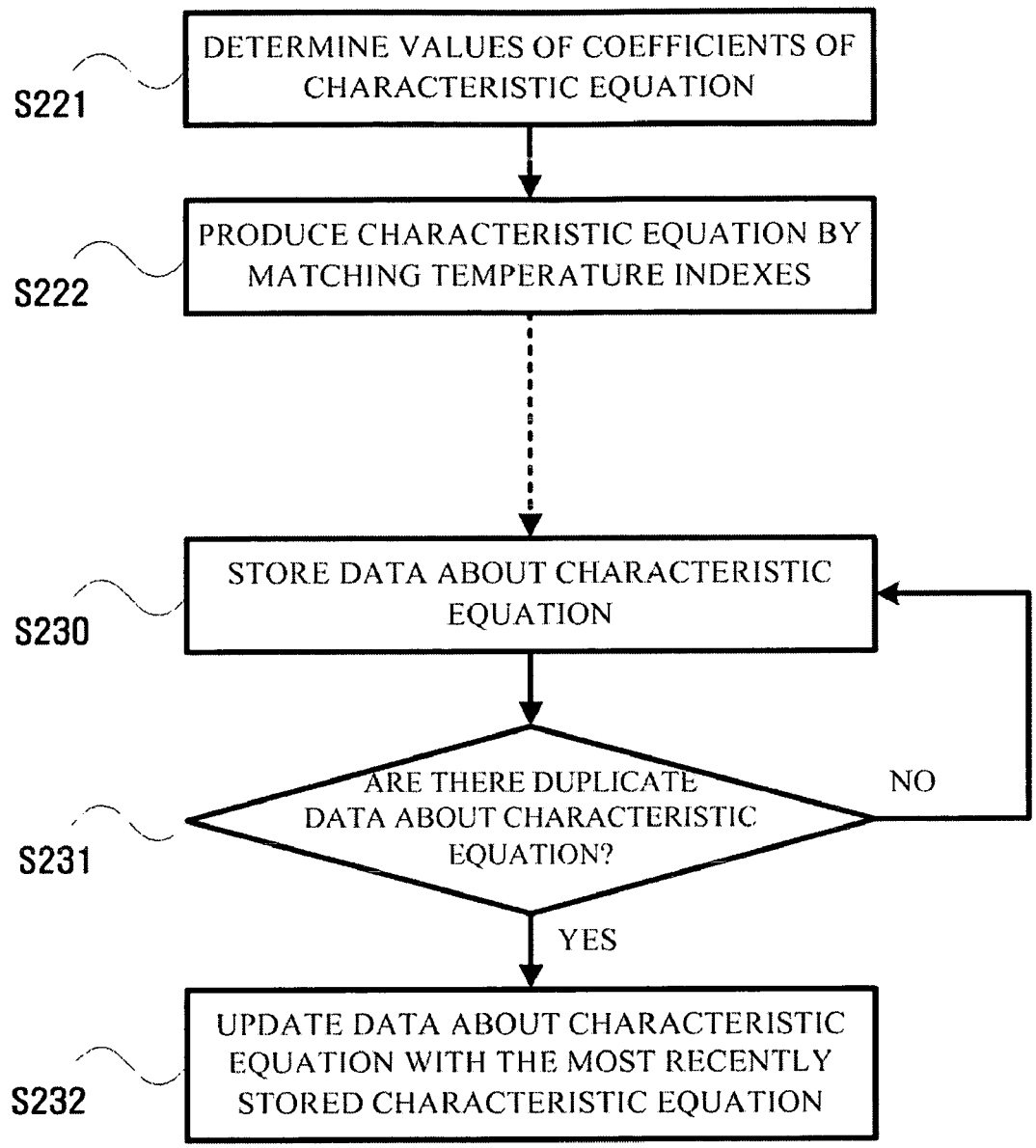
FIG. 4 is a detailed flowchart illustrating the storing of a characteristic equation in the method of calibrating a gyro-sensor according to an embodiment of the present invention.
Figure 5:
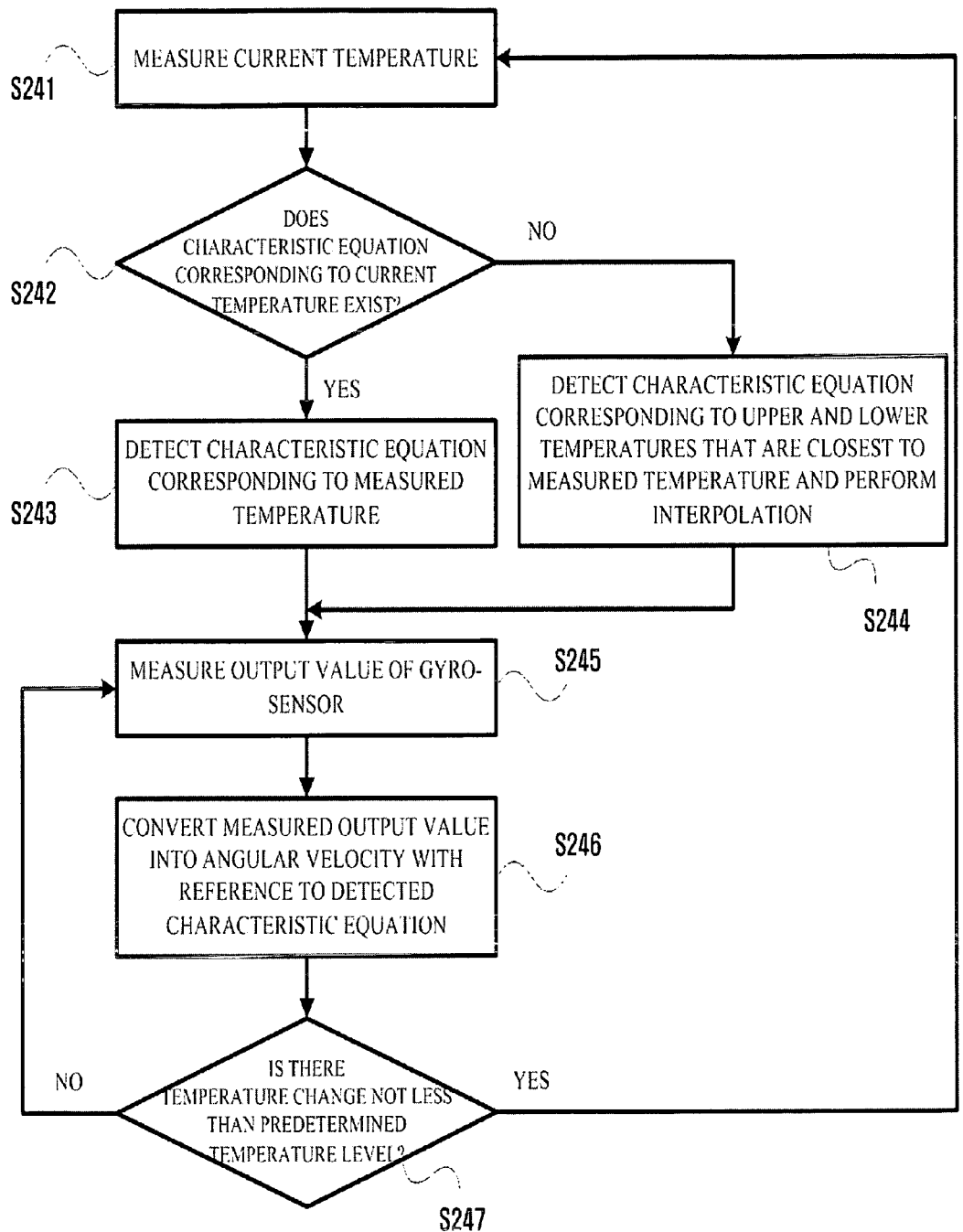
FIG. 5 is a detailed flowchart illustrating the calibration of a gyro-sensor in the method of calibrating a gyro-sensor according to an embodiment of the present invention.

An overall calibration procedure performed by a gyro-sensor according to an embodiment of the present invention will be described with reference to FIG. 2 and various operations of the calibration method shown in FIG. 2 will be described in detail with reference to FIGS. 3 through 5. FIG. 2 is a flowchart illustrating a method of calibrating a gyro-sensor according to an embodiment of the present invention, FIG. 3 is a detailed flowchart illustrating the measurement of an angular velocity and an output value of a gyro-sensor in the method of calibrating a gyro-sensor according to an embodiment of the present invention, FIG. 4 is a detailed flowchart illustrating the producing and storing of a characteristic equation in the method of calibrating a gyro-sensor according to an embodiment of the present invention, and FIG. 5 is a detailed flowchart illustrating the calibrating of a gyro-sensor in the method of calibrating a gyro-sensor according to an embodiment of the present invention.

Referring to FIGS. 2-5, as a first operation (S210 of FIG. 2), the measurement module 100 obtains an angular velocity ω of the moving body equipped with the gyro-sensor and an average output value of the gyro-sensor. The angular velocity ω can be obtained using a rotation time period T of the moving body when the moving body is at a fixed location, as indicated by the following equation:

$$\omega = \frac{2\pi}{T}.$$

A method of obtaining the rotation time period T will be described in detail with reference to FIG. 3.

In operation S211, when using infrared transmission, the moving body 710 having the infrared reception unit 711 is allowed to rotate on the home base 720 having the infrared transmission unit 721 at a constant angular velocity. Alternatively, when using hole sensors, the moving body 710 equipped with a plurality of hole sensors disposed in constant intervals is allowed to rotate at a constant angular velocity on the home base 720 having the permanent magnet 722 detecting the hole sensors.

In operation S212, a first sensing time at which the infrared reception unit 711 senses for the first time infrared rays emitted by the infrared transmission unit 721 or at which the nth hole sensor 712_n among the plurality of hole sensors is sensed by the permanent magnet 722 is measured. In operation S213, the moving body 720 rotates once, and then, a second sensing time at which the infrared reception unit 711 senses for the second time infrared rays emitted by the infrared transmission unit 721 or at which the (n+1)th hole sensor 712_n+1 is sensed is measured.

Then, the moving body 720 is allowed to stop rotating, as indicated by "STOP" state, as shown in the lower right portion of FIG. 7. The rotation time period T corresponding to a time taken for the moving body 710 to rotate once is obtained using a difference between the first sensing time and the second sensing time, and the angular velocity ω is obtained using the rotation time period T, in operation S213. An average gyro output value is obtained by integrating a plurality of gyro output values, which are measured at a variety of points of measurement time ranging between the first sensing time and the second sensing time, in operation S214.

An iteration of the above-described operations is performed while varying the angular velocity ω. Since the gyro characteristic equation is an equation of an n-th degree and (n+1) coefficients, i.e., $C_0, C_1, C_2, \ldots, C_n$, are available, (n+1) measurements of angular velocity F(x) and a total of (n+1) gyro output values x are needed. Since the constant term $C_0$ is obtained by measuring the gyro output value in a state where the moving body 710 stops rotating, in operation S215, it is determined whether the iteration has been performed n times. If the iteration performed does not exceed n times, the angular velocity is varied in operation S216 to perform the iteration from operation S211 to operations S214 again. On the other hand, if the iteration from operations S211 to S214 has been performed n times, in S217, n measurements of angular velocity obtained from n rotation time periods are obtained and n gyro output values corresponding to the n measurements of angular velocity are also obtained, thus yielding a set of n gyro output values corresponding to the n measurements of angular velocity.

Meanwhile, in order to yield a plurality of sets of measurements of angular velocity and gyro output values for a plurality of temperatures of a specified temperature interval, in operation S218, each of the plurality of sets of measurements of angular velocity and gyro output values is matched to each of the plurality of temperatures. That is to say, That is to say, tuple sets consisting of n measurements of angular velocity (deg/sec) and n average output values(mV) measured at different temperatures at a specified interval within a specified temperature range are obtained and the obtained tuple sets are matched with the temperatures measured when the respective ones of the tuple sets are obtained. And, the matched temperature can serve as an index. Here, the specified plurality may equal to a total number of coefficients of the gyro characteristic equation where the gyro output values are independent variables and the measurements of angular velocity are dependent variables. In addition, the specified temperature range may be between −10° C. and 40° C. Further, the specified temperature interval may be approximately 2° C. As described above, the gyro output values may be affected by a change in the temperature. Thus, in order to obtain more data measurements at as many temperatures as possible, it is necessary to provide a set of (n+1) measurements of angular velocity and gyro output values corresponding to the (n+1) measurements of angular velocity at the respective temperatures of as a small temperature interval as possible.

Meanwhile, in order to obtain an offset value, i.e., the contact $C_0$ among the (n+1) coefficients, the gyro output value is measured when the moving body 710 rotates at 0 [deg/sec], as indicated by a "STOP ROTATING" state 750. Accordingly, like in operation S215 of FIG. 3, it is determined whether the iteration has been performed n times. Preferred examples of the "STOP ROTATING" state of the moving body 710 include a state immediately before the moving body 710 is separated from the home base to perform a specified operation, e.g., cleaning, or a state immediately after the moving body 710 terminates the specified operation to return to the home base 720.

As a second operation (S220 of FIG. 2), the operation module 200 obtains data about a characteristic equation of the gyro sensor using the measured angular velocity and the average gyro output value.

As a third operation (S230 of FIG. 2), the storage module 300 stores the data about the characteristic equation obtained by the operation module 200. The second and third operations will later be described in further detail with reference to FIG. 4.

In operation S221, the characteristic equation is produced by calculating values of the coefficients of the characteristic equation. If one or more characteristic equations for temperature indexes are necessary, characteristic equations for different temperatures may be produced in operation S222. The storage module 300 stores data about the produced characteristic equations in operation S230. In operation S231, it is determined whether duplicate data about the characteristic equations are stored in the storage module 300 using one and the same temperature as the temperature index. If not, the process returns to operation S230. conversely, in operation S232, if duplicate data about the characteristic equations are stored in the storage module 300 using the same temperature as the temperature index, updating is performed on data that has been most recently stored in the storage module 300.

The number of the coefficients of the characteristic equation, i.e., $C_0, C_1, C_2, \ldots, C_n$, is (n+1) in total and the coefficients vary according to temperatures. Accordingly, the coefficients can be obtained at different temperatures by substituting a set of (n+1) measurements of angular velocity and (n+1) average output values for the characteristic equation for each of the different temperatures. Based on the obtained coefficients, the characteristic equation can be produced to then be stored. Data about coefficients of the characteristic equation produced at different temperatures can be collected as a database.

As a fourth operation (S240 of FIG. 2), the calibration module 400 calibrates the gyro-sensor using the data about the characteristic equation, which will be described in further detail with reference to FIG. 5. FIG. 5 illustrates a process of calibrating a gyro-sensor using the stored data about the characteristic equation for temperature indexes. The present embodiment is not limited to the calibration process using data about characteristic equations stored for the respective temperature indexes and the calibration process can be performed irrespective of temperature indexes, which is the same as described above. However, for brevity, the process of calibrating a gyro-sensor will be described with regard to the use of the stored data about the characteristic equation for temperature indexes with reference to FIG. 5.

The gyro-sensor is calibrated in real time based on the data about the characteristic equation stored in the storage module 300 while estimating the location of the moving body 710. Referring to FIG. 5, in operation S241, while the moving body 710 moves and estimates its location, a current temperature is measured. In operation S242, it is determined whether or not the data about the characteristic equation exists in the storage module 300 using the current temperature as the temperature index. In operation S243, if the data about the characteristic equation exists in the storage module 300, the data about the characteristic equation is detected from the storage module 300. On the other hand, if it is determined in operation S242 that the data about the characteristic equation does not exist in the storage module 300, the data corresponding to a pair of upper and lower temperatures that are closest to the current temperature in operation S244, which is because a characteristic equation corresponding to the current temperature can be obtained through interpolation based on the two detected data about the characteristic equation.

Meanwhile, in order to estimate a current location of the moving body 710 using the gyro-sensor, the measurement module 100 measures the gyro output value at the current temperature in operation S245. Thereafter, the gyro output value measured at the current temperature is converted into an angular velocity with reference to the data about the characteristic equation detected from the storage module 300. In operation S246, the gyro-sensor is calibrated in real time.

In operation S247, it is determined whether there is a temperature change not less than a specified temperature level. If it is determined in operation S247 that there is a temperature change not less than the specified temperature level, the process returns to operation S241. On the other hand, if it is determined in operation S247 that there is no temperature change or a slight temperature change, the process returns to operation S245 without detecting the characteristic equation from the storage module 300, to then measure the gyro output value again. Here, the specified temperature level may be approximately 2° C. because the characteristic equation is stored in the storage module 300 in a temperature interval of 2° C.

Meanwhile, the calibrating apparatus of the gyro-sensor according to the above-described embodiments of the present invention is not limited to the illustrated embodiment and it will be apparent to those skilled in the art that the invention can also be applied to a computer readable recording medium having program codes recorded therein, the program codes for executing the above-described calibrating method without departing from the scope and spirit of the invention.

According to the above-described embodiments of the present invention, data about a characteristic equation of the gyro-sensor, which can be used to estimate the location of a moving body is detected in real time and an output value of the gyro-sensor is converted into an angular velocity to calibrate an offset of the gyro-sensor and a characteristic curve, thereby enhancing the accuracy of measuring the angular velocity of the gyro-sensor.

In addition, the accuracy of measuring the angular velocity of the gyro-sensor can be enhanced at low cost, so that the invention can be applied to a mobile robot, such as a cleaning robot.

Further, embodiments of the present invention allow for continuous calibration, making it possible to reduce an error of a gyro-sensor which is generated after an extended use of time of the gyro-sensor and using the detected characteristic curve.

In addition, since a highly accurate calibrating process is not necessary to perform in the manufacture of the gyro-sensor, the manufacturing cost can be reduced and the precision level of the gyro-sensor can be maintained irrespective of a change in the temperature.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of calibrating a gyro-sensor, the method comprising:
    (a) measuring an angular velocity of a moving body and an average output value of the gyro-sensor when the moving body, equipped with the gyro-sensor, rotates;
    (b) obtaining data about a characteristic equation of the gyro sensor using the measured angular velocity and the average output value and storing the data; and
    (c) calibrating the gyro-sensor using the stored data about the characteristic equation.

2. The method of claim 1, wherein the gyro-sensor is disposed at a rotation axis of a rotation motor in the moving body.

3. The method of claim 1, wherein operation (c) comprises:
    (c1) measuring the output value of the gyro-sensor; and
    (c2) converting the measured output value into an angular velocity using the stored data about the characteristic equation.

4. The method of claim 1, wherein the mobile body is equipped with an infrared reception unit, and
    wherein operation (a) comprises:
    (a1) rotating the moving body on a home base having an infrared transmission unit at a constant angular velocity;
    (a2) measuring a first sensing time at which the infrared reception unit senses for a first time infrared rays emitted by the infrared transmission unit;
    (a3) measuring a second sensing time at which the infrared reception unit senses for the second time infrared rays emitted by the infrared transmission unit;
    (a4) obtaining an angular velocity using a difference between the first sensing time and a second sensing time;
    (a5) obtaining an average output value of the gyro-sensor over a rotation time period obtained using the difference between the first sensing time and the second sensing time; and
    (a6) iteratively performing operations (a1) through (a5) a specified number of times when the moving body rotates at the measured angular velocity and at each of a plurality of measurements of angular velocity different from the measured angular velocity, and obtaining a set of the plurality of measurements of angular velocity and a plurality of average output values corresponding to the plurality of measurements of angular velocity.

5. The method of claim 4, wherein the plurality equals a total number of coefficients of the characteristic equation minus a number of a constant term, the characteristic equation having the gyro output values as independent variables and the measurements of angular velocity as dependent variables.

6. The method of claim 4, further comprising obtaining an output value of the gyro-sensor when the moving body stops rotating, before performing operation (a1).

7. The method of claim 6, wherein the moving body stops rotating immediately before the moving body is separated from the home base to perform a specified operation or immediately after the moving body terminates a specified operation to return to the home base.

8. The method of claim 4, further comprising:
    (a7) matching temperature values measured each time operation (a6) is performed, to the obtained set resulting from operation (a6), as temperature indexes; and
    (a8) iteratively performing operations (a1) through (a7) at a specified temperature interval within a specified temperature range including a current temperature value and obtaining sets for the temperature indexes.

9. The method of claim 8, wherein operation (b) comprises:
    (b1) determining values of the coefficients of the characteristic equation, having the gyro output values as independent variables and the measurements of angular velocity as dependent variables;
    (b2) matching data about the characteristic equation obtained using the coefficients to the temperature indexes and producing the characteristic equation; and
    (b3) storing the data about the characteristic equation.

10. The method of claim 9, wherein, when duplicate data about the characteristic equation are stored using for same temperature as the temperature index, operation (b) comprises updating the data about the characteristic equation using a most recently stored one of the duplicate data.

11. The method of claim 9, wherein operation (c) comprises:
- (c1) measuring a current temperature and detecting data about the characteristic equation using the measured current temperature as the temperature index,
- (c2) measuring the output value of the gyro sensor at the current temperature; and
- (c3) converting the measured output value into an angular velocity using the detected data about the characteristic equation.

12. The method of claim 11, further comprising (c4) iteratively performing operations (c1) through (c3), when there is a temperature change not less than a specified temperature level.

13. The method of claim 1, wherein the mobile body is equipped with a plurality of hole sensors disposed in constant intervals, and wherein operation (a) comprises:
- (a1) rotating the moving body at a constant angular velocity on a home base in which a permanent magnet is disposed;
- (a2) measuring a first sensing time at which the permanent magnet is sensed by an nth hole sensor among the plurality of hole sensors;
- (a3) measuring a second sensing time at which the permanent magnet is sensed by a (n+1)th hole sensor among the plurality of hole sensors after the first sensing time;
- (a4) obtaining an angular velocity using a difference between the first sensing time and the second sensing time;
- (a5) obtaining an average output value of the gyro-sensor over a rotation time period obtained using the difference between the first sensing time and the second sensing time; and
- (a6) iteratively performing operations (a1) through (a5) a specified number of times when the moving body rotates at the measured angular velocity and at each of a plurality of measurements of angular velocity different from the measured angular velocity and obtaining a set of the plurality of measurements of angular velocity and a plurality of average output values corresponding to the plurality of measurements of angular velocity.

14. The method of claim 13, wherein the plurality equals a total number of coefficients of the characteristic equation minus a number of a constant term, the characteristic equation having the gyro output values as independent variables and the measurements of angular velocity as dependent variables.

15. The method of claim 13, further comprising measuring an output value of the gyro-sensor when the moving body stops rotating, before performing operation (a1).

16. The method of claim 15, wherein the moving body stops rotating immediately before the moving body is separated from the home base to perform a specified operation or immediately after the moving body terminates a specified operation to return to the home base.

17. The method of claim 13, further comprising:
- (a7) matching temperature values measured each time operation (a6) is performed, to the obtained set resulting from operation (a6), as temperature indexes; and
- (a8) iteratively performing operations (a1) through (a7) at a specified temperature interval within a specified temperature range including a current temperature value and obtaining sets for the temperature indexes.

18. The method of claim 17, wherein operation (b) comprises:
- (b1) determining values of the coefficients of the characteristic equation, having the gyro output values as independent variables and the measurements of angular velocity as dependent variables;
- (b2) matching data about the characteristic equation obtained using the coefficients to the temperature indexes and producing the characteristic equation; and
- (b3) storing the data about the characteristic equation.

19. The method of claim 18, wherein, when duplicate data about the characteristic equation are stored using for same temperature as the temperature index, operation (b) comprises updating the data about the characteristic equation using a most recently stored one of the duplicate data.

20. The method of claim 18, wherein operation (c) comprises:
- (c1) measuring a current temperature and detecting data about the characteristic equation using the measured current temperature as the temperature index;
- (c2) measuring the output value of the gyro sensor at the current temperature; and
- (c3) converting the measured output value into an angular velocity using the detected data about the characteristic equation.

21. The method of claim 20 further comprising (c4) iteratively performing operations (c1) through (c3), when there is a temperature change not less than a specified temperature level.

22. An apparatus for calibrating a gyro-sensor, the apparatus comprising;
- a measurement module obtaining an angular velocity of a moving body and an average output value of the gyro-sensor when the moving body equipped with the gyro-sensor rotates;
- an operation module obtaining data about a characteristic equation of the gyro sensor using the obtained angular velocity and the average output value;
- a storage module storing the obtained data; and
- a calibration module calibrating the gyro-sensor using the data about the characteristic equation.

23. The apparatus of claim 22, wherein the measurement module measures the gyro output values and the angular velocity by installing the gyro-sensor at a rotation axis of a rotation motor in the moving body.

24. The apparatus of claim 22, wherein the calibration module measures the output value of the gyro-sensor, and converts the measured output value into an angular velocity using the stored data about the characteristic equation.

25. The apparatus of claim 22, wherein the moving body is equipped with an infrared reception unit, and
wherein when the moving body rotates on a home base having an infrared transmission unit at a constant angular velocity the measurement module measures a first sensing time at which the infrared reception unit senses for a first time infrared rays emitted by the infrared transmission unit and a second sensing time at which the infrared reception unit senses for a second time infrared rays emitted by the infrared transmission unit, obtains an angular velocity using a difference between the first sensing time and the second sensing time, obtains an average output value of the gyro-sensor over a rotation time period obtained using the difference between the first sensing time and the second sensing time, and iteratively performs the measuring operation and the obtaining operations a specified number of times when the moving body rotates at the measured angular velocity and a plurality of measurements of angular velocity different from the measured angular velocity, obtains a set of the plurality of measurements of angular velocity and a plurality of average output values corresponding to the plurality of measurements of angular velocity.

26. The apparatus of claim 25, wherein the plurality equals a total number of coefficients of the characteristic equation minus a number of a constant term, the characteristic equation having the gyro output values as independent variables and the measurements of angular velocity as dependent variables.

27. The apparatus of claim 25, wherein the measurement module obtains an output value of the gyro-sensor when the moving body stops rotating.

28. The apparatus of claim 27, wherein the moving body stops rotating comprises a state immediately before the moving body is separated from the home base to perform a specified operation or immediately after the moving body terminates a specified operation to return to the home base.

29. The apparatus of claim 25, wherein the measurement module obtains sets for temperature indexes at different temperatures at a specified temperature interval within a specified temperature range including a current temperature value using values of temperatures measured each time the set is obtained, as the temperature indexes.

30. The apparatus of claim 29, wherein the operation module determines values of the coefficients of the characteristic equation, having the gyro output values as independent variables and the measurements of angular velocity as dependent variables, matches data about the characteristic equation obtained using the coefficients to the temperature indexes and producing the characteristic equation, and stores the data about the characteristic equation.

31. The apparatus of claim 30, wherein, when duplicate data about the characteristic equation are stored using the same temperature as the temperature index, the storage module updates the data about the characteristic equation using a most recently stored one of the duplicate data.

32. The apparatus of claim 30, wherein the calibration module measures a current temperature and detects data about the characteristic equation using the measured current temperature as the temperature index, measures the output value of the gyro sensor at the current temperature, and converts the measured output value into an angular velocity using the detected data about the characteristic equation.

33. The apparatus of claim 32, wherein, when there is a temperature change of not less than a specified temperature level, the calibration module converts the gyro output value into an angular velocity by measuring a temperature again when the temperature change occurs and detecting data about a new characteristic equation having temperatures that are closest to the re-measured temperature as the temperature index.

34. The apparatus of claim 22, wherein the mobile body is equipped with a plurality of hole sensors disposed in constant intervals, and wherein when the moving body rotates at a constant angular velocity on a home base in which a permanent magnet is disposed, the measurement module measures a first sensing time at which the permanent magnet is sensed by an nth hole sensor among the plurality of hole sensors and a second sensing time at which the permanent magnet is sensed by a (n+1)th hole sensor among the plurality of hole sensors after the first sensing time, obtains an angular velocity using a difference between the first sensing time and the second sensing time, obtains an average output value of the gyro-sensor over a rotation time period obtained using the difference between the first sensing time and the second sensing time, and iteratively performs the measuring operation and the obtaining operations a specified number of times when the moving body rotates at the measured angular velocity and a plurality of measurements of angular velocity different from the measured angular velocity, obtains a set of the plurality of measurements of angular velocity and a plurality of average output values corresponding to the plurality of measurements of angular velocity.

35. The apparatus of claim 34, wherein the plurality equals a total number of coefficients of the characteristic equation minus a number of a constant term, the characteristic equation having the gyro output values as independent variables and the measurements of angular velocity as dependent variables.

36. The apparatus of claim 34, wherein the measurement module obtains an output value of the gyro-sensor when the moving body stops rotating.

37. The apparatus of claim 36, wherein the moving body stops rotating comprises a state immediately before the moving body is separated from the home base to perform a specified operation or immediately after the moving body terminates a specified operation to return to the home base.

38. The apparatus of claim 35, wherein the measurement module obtains sets for temperature indexes at different temperatures at a specified temperature interval within a specified temperature range including a current temperature value using values of temperatures measured each time the set is obtained, as the temperature indexes.

39. The apparatus of claim 38, wherein the operation module determines values of the coefficients of the characteristic equation, having the gyro output values as independent variables and the measurements of angular velocity as dependent variables, matches data about the characteristic equation obtained using the coefficients to the temperature indexes and producing the characteristic equation, and stores the data about the characteristic equation.

40. The apparatus of claim 39, wherein, when duplicate data about the characteristic equation are stored using the same temperature as the temperature index, the storage module updates the data about the characteristic equation using a most recently stored one of the duplicate data.

41. The apparatus of claim 40, wherein the calibration module measures a current temperature and detects data about the characteristic equation using the measured current temperature as the temperature index, measures the output value of the gyro sensor at the current temperature, and converts the measured output value into an angular velocity using the detected data about the characteristic equation.

42. The apparatus of claim 41, wherein, when there is a temperature change of not less than a specified temperature level, the calibration module converts the gyro output value into an angular velocity by measuring a temperature again when the temperature change occurs and detecting data about a new characteristic equation having temperatures that are closest to the re-measured temperature as the temperature index.

43. A method of enhancing an efficiency of location estimation of a mobile robot, comprising:
measuring an angular velocity of the mobile robot via a gyro-sensor in the mobile robot and measuring an average output of the gyro-sensor at each of plural temperatures;
obtaining a characteristic equation for each of the temperatures, each characteristic equation yielding a characteristic curve usable to estimate a location of the mobile robot in real time; and
calibrating the gyro-sensor based on data of to at least one of the plurality of characteristic equations corresponding to a current temperature.

44. The method of claim 43, wherein, when there a characteristic equation corresponding to the current temperature, the data corresponding to the characteristic equation is used to calibrate the gyro-sensor, and wherein, when there is no characteristic equation corresponding to the current temperature, data about two characteristic equations corresponding to a pair of upper and lower temperatures that are closest to the current temperature are interpolated and the interpolated data is used to calibrate the gyro-sensor.

45. The method of claim 43, wherein a characteristic curve of the gyro-sensor is adaptively calibrated in real time.

* * * * *

UNITED STATES PATENT AND TRADEMARK OFFICE
CERTIFICATE OF CORRECTION

PATENT NO. : 7,526,398 B1
APPLICATION NO. : 11/524397
DATED : April 28, 2009
INVENTOR(S) : Ki-wan Choi et al.

Page 1 of 1

It is certified that error appears in the above-identified patent and that said Letters Patent is hereby corrected as shown below:

Title page, item [75], Line 2, change "Hyuong-ki Lee" to --Hyoung-ki Lee--.

Column 13, Line 7, change "index," to --index;--.

Column 13, Line 43, change "velocity" to --velocity,--.

Column 14, Line 26, change "20" to --20,--.

Column 14, Line 31, change "comprising;" to --comprising:--.

Column 14, Line 54, change "velocity" to --velocity,--.

Column 16, Line 21, change "35," to --34,--.

Column 17, Line 1, after "there" insert --is--.

Signed and Sealed this

Sixteenth Day of March, 2010

David J. Kappos
*Director of the United States Patent and Trademark Office*